(12) United States Patent
Liu et al.

(10) Patent No.: US 11,561,460 B2
(45) Date of Patent: Jan. 24, 2023

(54) PROJECTOR

(71) Applicant: Coretronic Corporation, Hsin-Chu (TW)

(72) Inventors: I-Ming Liu, Hsin-Chu (TW); Fan-Chieh Chang, Hsin-Chu (TW)

(73) Assignee: Coretronic Corporation, Hsin-Chu (TW)

(\*) Notice: Subject to any disclaimer, the term of this patent is extended or adjusted under 35 U.S.C. 154(b) by 0 days.

(21) Appl. No.: 17/225,094

(22) Filed: Apr. 7, 2021

(65) Prior Publication Data

US 2021/0318598 A1 Oct. 14, 2021

(30) Foreign Application Priority Data

Apr. 13, 2020 (CN) .......................... 202020530898.4

(51) Int. Cl.
  *G03B 21/16* (2006.01)
  *G03B 21/14* (2006.01)

(52) U.S. Cl.
  CPC ........... *G03B 21/16* (2013.01); *G03B 21/145* (2013.01)

(58) Field of Classification Search
  CPC .............................. G03B 21/16; G03B 21/145
  USPC .......................................................... 353/58
  See application file for complete search history.

(56) References Cited

U.S. PATENT DOCUMENTS 9,667,924 B2   5/2017  Mukai et al.
2020/0393745 A1 * 12/2020  Shie ..................... G03B 21/145

FOREIGN PATENT DOCUMENTS

| CN | 107229177 | | 10/2017 |
| CN | 206743456 U | * | 12/2017 |
| JP | 2012037674 A | * | 2/2012 |
| JP | 2016145850 A | * | 8/2016 |
| TW | M497730 | | 3/2015 |

OTHER PUBLICATIONS

Machine translation of 206743456 (Year: 2022).*
Machine translation of 2016145850 (Year: 2022).*
Machine translation of 2012037674 (Year: 2022).*

\* cited by examiner

*Primary Examiner* — Jerry L Brooks
(74) *Attorney, Agent, or Firm* — JCIPRNET

(57) ABSTRACT

A projector includes an outer casing and a projection module. The outer casing has a front end surface, a projection opening, and at least one heat dissipation opening. The projection opening and the at least one heat dissipation opening are located at the front end surface. The projection module is disposed in the outer casing and includes a light source module configured to provide an illumination beam, a light valve configured to convert the illumination beam to an image beam, and a projection lens protruding from the front end surface and is configured to project the image beam out of the outer casing through the projection opening. The projection module is configured to rotate relative to the outer casing to change a projection direction of the image beam and may be embedded in a ceiling and present a better appearance, and the projection direction of the projector is less restricted.

13 Claims, 6 Drawing Sheets

PROJECTOR

CROSS-REFERENCE TO RELATED APPLICATION

This application claims the priority benefit of China patent application serial no. 202020530898.4, filed on Apr. 13, 2020. The entirety of the above-mentioned patent application is hereby incorporated by reference herein and made a part of this specification.

BACKGROUND OF THE INVENTION

Field of the Invention

The invention relates to a display apparatus, and particularly relates to a projector.

Description of Related Art

A projector is a display apparatus configured to generate large-size images. The imaging principle of the projector is to convert an illumination beam generated by a light source to an image beam by a light valve and then project the image beam to a screen or a wall by a projection lens.

A hanging-type projector, for instance, is generally fixed to a cantilever extending from a wall or a ceiling and projects images to a projection screen mounted on the wall. Under such configuration, the projector is hanging from the ceiling, which looks out of place and unaesthetic, and the wires of the projector may also be exposed under the ceiling. In addition, a projection direction of the hanging-type projector is mostly limited to a forward direction to the wall, and thus the application of the projector is restricted to some extent.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projector, which can be embedded in a ceiling and present a good appearance, and a projection direction of the projector is less restricted.

Other objects and advantages of the invention can be further understood from the technical features disclosed in the invention.

In order to achieve one or a portion of or all of the objectives or other objectives, an embodiment of the invention provides a projector including an outer casing and a projection module. The outer casing has a front end surface, a projection opening, and at least one heat dissipation opening. The projection opening and the at least one heat dissipation opening are located at the front end surface of the outer casing. The projection module is disposed in the outer casing and includes a light source module, a light valve, and a projection lens. The light source module is configured to provide an illumination beam, and the light valve is configured to convert the illumination beam to an image beam. The projection lens protrudes from the front end surface and is configured to project the image beam out of the outer casing through the projection opening. The projection module is configured to rotate relative to the outer casing to change a projection direction of the image beam.

Based on the above, the embodiments of the invention have at least one of the following advantages. In the projector provided in one or more embodiments of the invention, the projection opening and the heat dissipation opening are both disposed on the front end surface of the outer casing, and therefore the projector may be embedded in the ceiling, and the projection opening and the heat dissipation opening located on the front end surface are exposed to an exterior side of the ceiling. Compared with the conventional hanging-type projector hanging from the ceiling, the projector provided in one or more embodiments of the invention may be embedded in the ceiling as described above and is less visually obtrusive, and the wires of the projector provided herein may be completely hidden above the ceiling, so as to enhance the aesthetic look of the projector after installation. In addition, the projection module provided herein may rotate relative to the outer casing to change the projection direction of the image beam, so that the projection direction of the projector is less restricted.

Other objectives, features and advantages of the invention will be further understood from the further technological features disclosed by the embodiments of the invention where there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure (s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similar, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
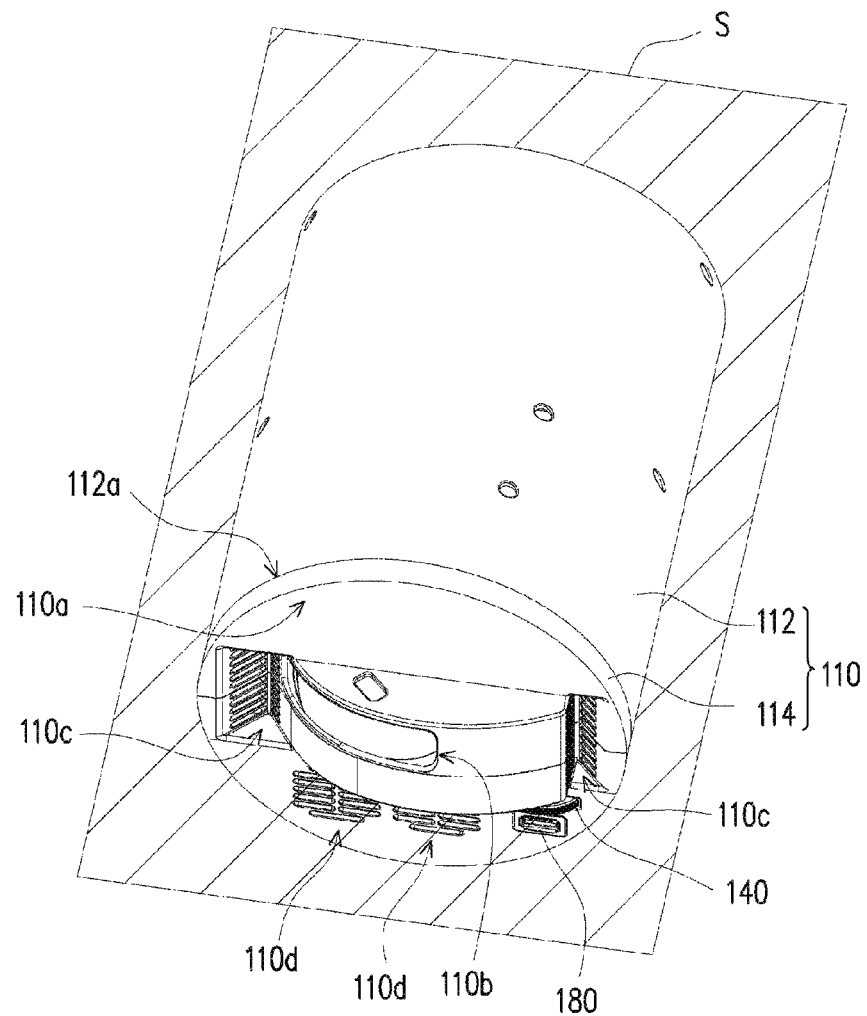
FIG. 1 is a three-dimensional view illustrating a projector according to an embodiment of the invention.
Figure 2:
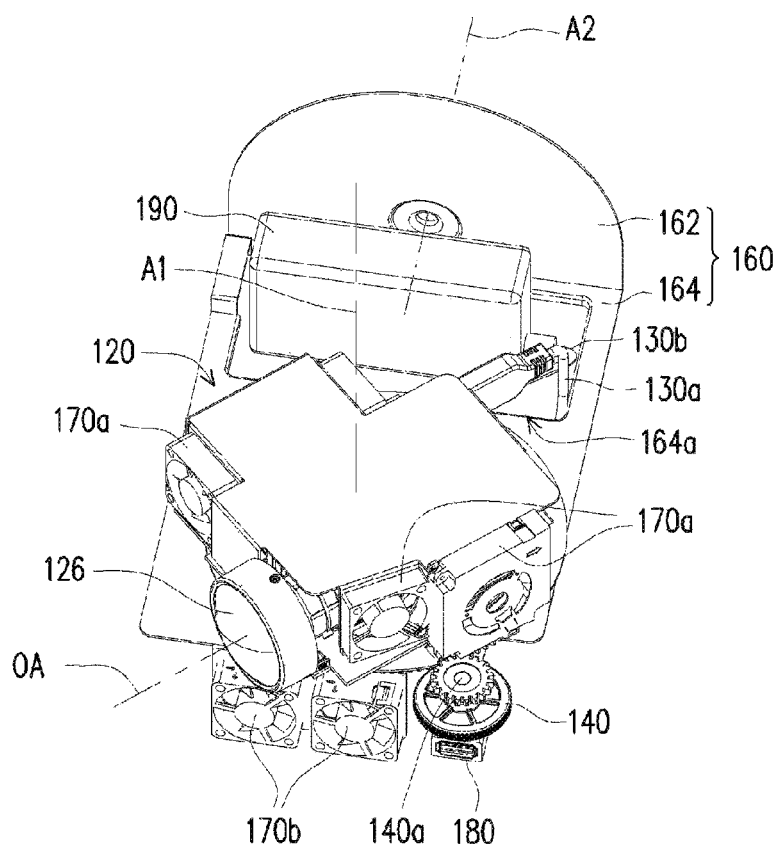
FIG. 2 is a three-dimensional view illustrating some components in the projector depicted in FIG. 1.
Figure 3:
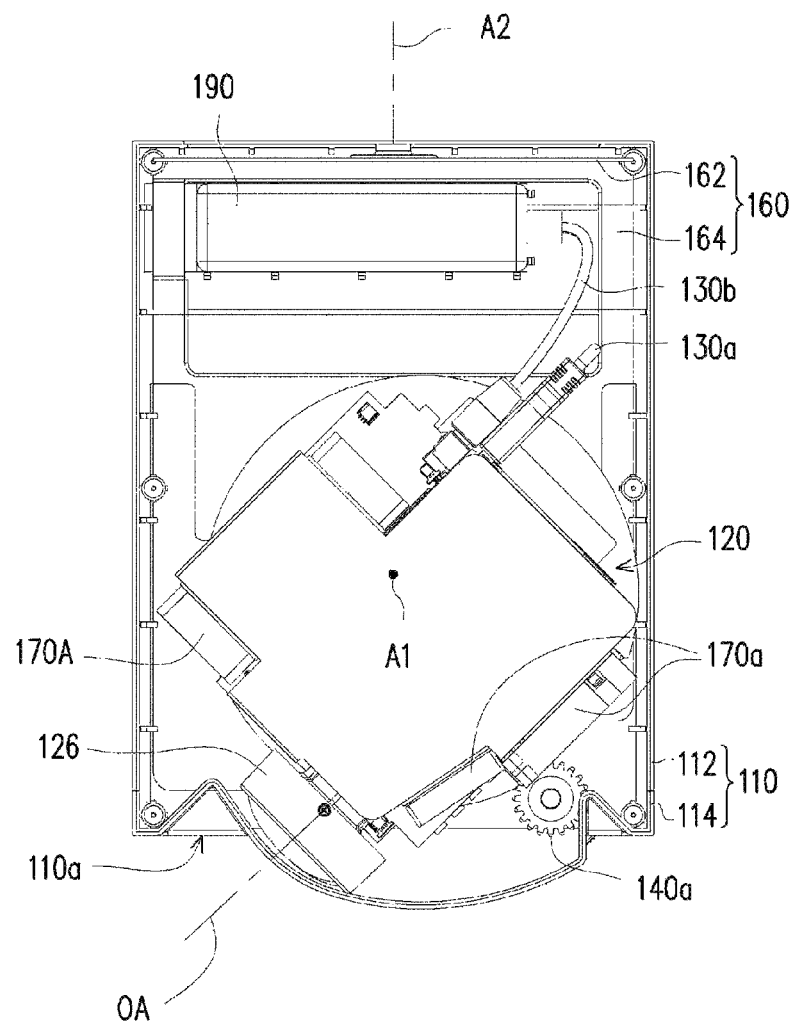
FIG. 3 is a side view illustrating some components in the projector depicted in FIG. 1.

FIG. 1 is a three-dimensional view of a projector according to an embodiment of the invention. FIG. 2 is a three-dimensional view of some components in the projector depicted in FIG. 1. FIG. 3 is a side view of some components in the projector depicted in FIG. 1. With reference to FIG. 1 to FIG. 3, a projector 100 provided in the embodiment includes an outer casing 110 and a projection module 120. The outer casing 110 has a front end surface 110a, a projection opening 110b, and a plurality of heat dissipation openings 110c and 110d, and the projection opening 110b and the heat dissipation openings 110c and 110d are located at the front end surface 110a of the outer casing 110. The projection module 120 is disposed in the outer casing 110 and is configured to project in an outward manner through the projection opening 110b, and heat generated during the operation of the projection module 120 is discharged through the heat dissipation openings 110c and 110d.

In the embodiment, the outer casing 110 includes a main casing 112 and a cover 114, the main casing 112 has an open end 112a, the cover 114 covers the main casing 112 at the open end 112a, and the front end surface 110a is located at the cover 114. In other embodiments, the outer casing 110 may be an integrally formed structure or a combination of multiple casings in other forms, which should not be construed as a limitation to the invention.

Figure 4:
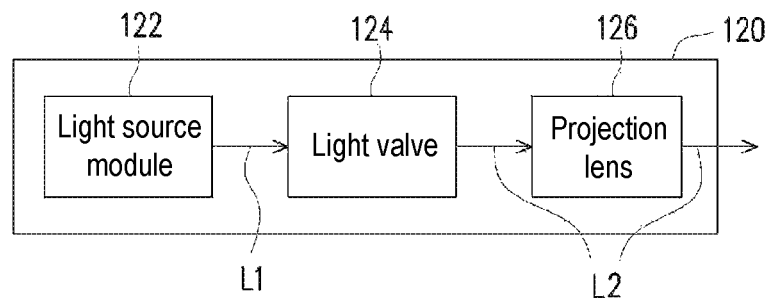
FIG. 4 is a schematic view illustrating the projection module depicted in FIG. 2.

FIG. 4 is a schematic view illustrating the projection module depicted in FIG. 2. As shown in FIG. 4, the projection module 120 provided in the embodiment includes a light source module 122, a light valve 124, and a projection lens 126. The light source module 122 is configured to provide an illumination beam L1, the light valve 124 is configured to convert the illumination beam L1 to an image beam L2, and the projection lens 126 protrudes from the front end surface 110a and is configured to project the image beam L2 out of the casing 110 through the projection opening 110b.

Figure 5:
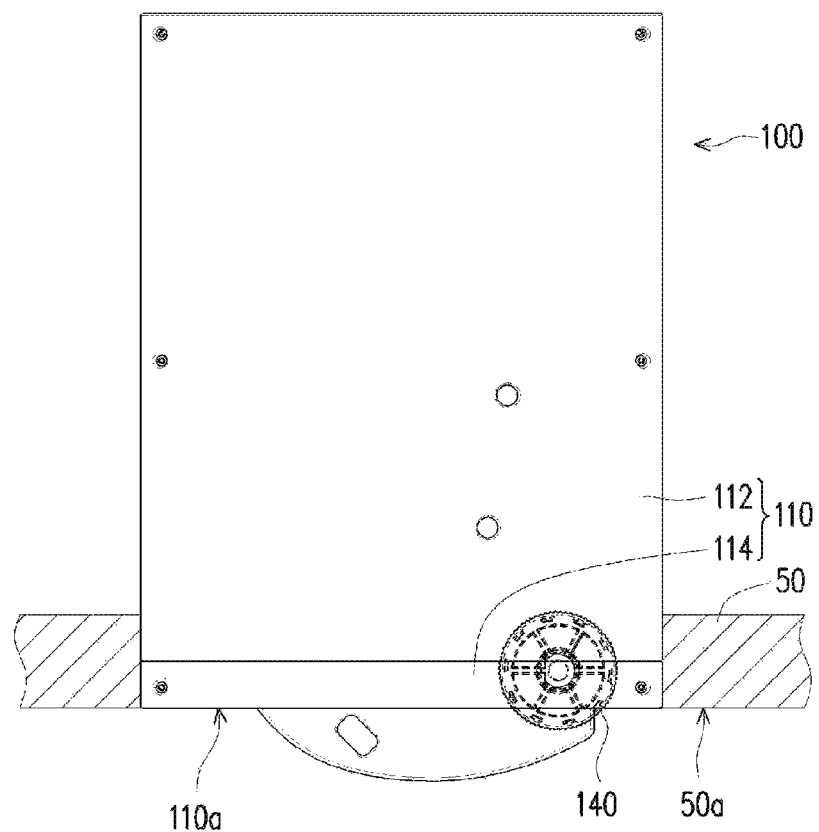
FIG. 5 illustrates that the projector depicted in FIG. 1 is embedded in a ceiling.

FIG. 5 illustrates that the projector depicted in FIG. 1 is embedded in a ceiling. Under the aforesaid configuration, the projection opening 110b and the heat dissipation openings 110c and 110d as shown in FIG. 1 are both disposed on the front end surface 110a of the outer casing 110. Therefore, as shown in FIG. 5, the projector 100 may be embedded in a ceiling 50, and the front end surface 110a of the outer casing 110 may be exposed to an exterior side 50a of the ceiling 50. That is, the projection opening 110b and the heat dissipation openings 110c and 110d located at the front end surface 110a of the outer casing 110 are also exposed to the exterior side 50a of the ceiling 50. Compared with a conventional projector hanging under the ceiling, the projector 100 provided in the embodiment may be embedded in the ceiling 50 as described above and is less visually obtrusive; moreover, the wires (such as a signal line 130a and a power cord 130b shown in FIG. 2 and FIG. 3) of the projector 100 may be completely hidden above the ceiling 50, so as to enhance the aesthetic look of the projector 100 after installation. In other embodiments, for instance, the projector 100 is embedded under the floor, and the projection lens 126 projects an image toward the ceiling or the wall, which is also less visually obtrusive.

In the embodiment, the projection module 120 is set to be able to rotate about a first axis A1 as a rotation axis relative to a main casing 112 of the outer casing 110, and the projection lens 126 is driven to move along the projection opening 110b to change the projection direction of the image beam L2 (shown in FIG. 4), so that the projection direction of the projector 100 is less restricted. The first axis A1 is perpendicular to an optical axis OA of the projection lens 126, for instance. The optical axis OA is parallel to the projection direction of the image beam L2.

With reference to FIG. 1 and FIG. 2, the projector 100 provided in the embodiment includes a rotation adjustment member 140 that is connected to the projection module 120 and is configured to drive the projection module 120 to rotate about the first axis A1 as the rotation axis. As shown in FIG. 1, a portion of the rotation adjustment member 140 protrudes out of the outer casing 110 from the front end surface 110a of the outer casing 110, so that a user is able to turn the rotation adjustment member 140 to drive the projection module 120 to rotate about the first axis A1, and the projection direction of the image beam L2 (shown in FIG. 4) projected from the projection lens 126 is further changed.

Figure 6:
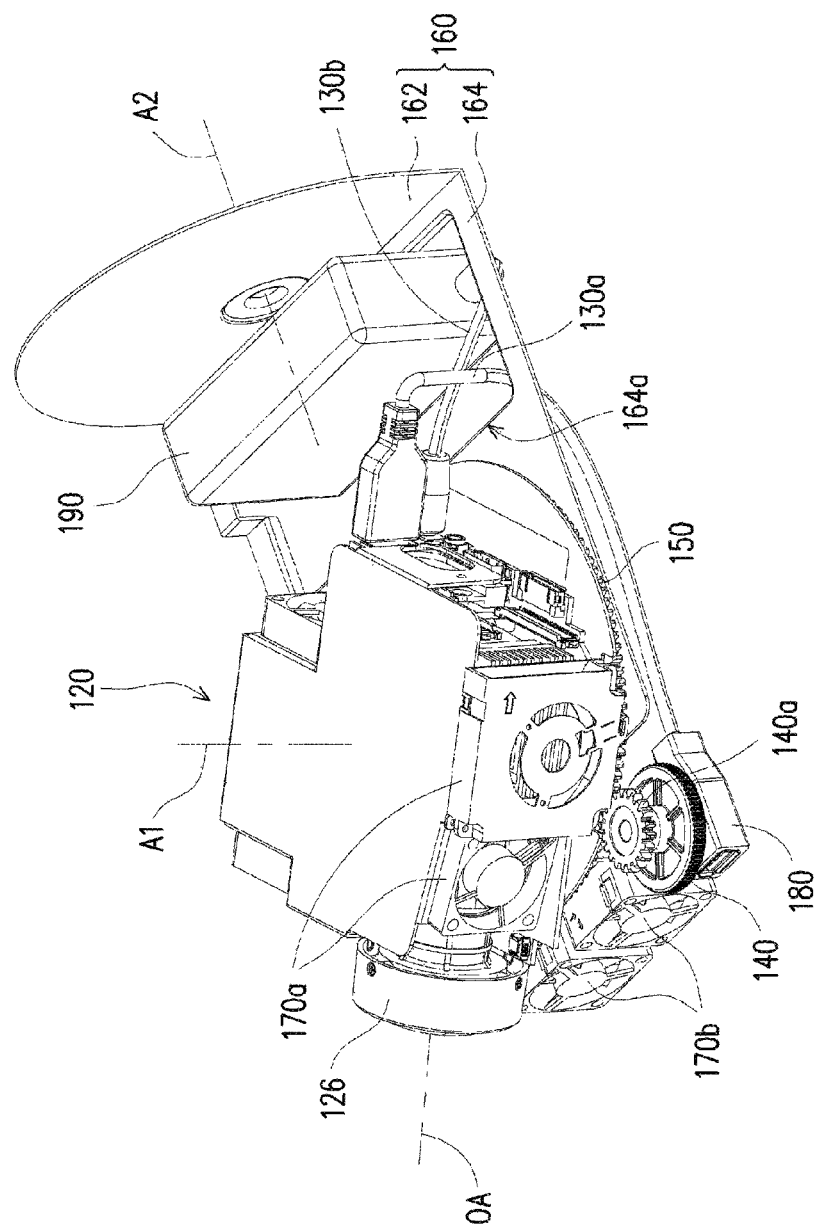
FIG. 6 is a three-dimensional view illustrating some components in the projector depicted in FIG. 2 at another view angle.
Figure 7:
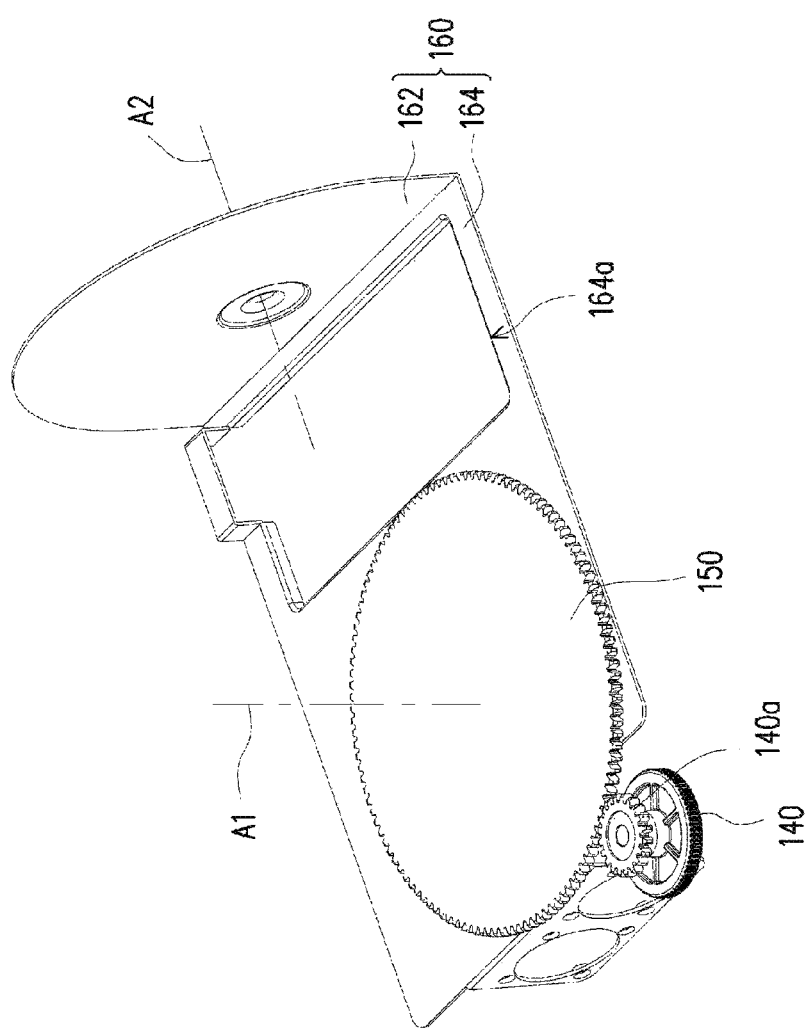
FIG. 7 is a three-dimensional view illustrating some components in the projector depicted in FIG. 6.

FIG. 6 is a three-dimensional view illustrating some components in the projector depicted in FIG. 2 at another view angle. FIG. 7 is a three-dimensional view illustrating some components in the projector depicted in FIG. 6. FIG. 6 and FIG. 7 do not illustrate the casing. With reference to FIG. 6 and FIG. 7, specifically, the rotation adjustment member 140 has a driving gear 140a disposed in the casing 110, and the driving gear 140a is coaxially connected to the rotation adjustment member 140, for instance. The projector 100 further includes a driven gear 150 that rotates about the first axis A1 as the rotation axis and is rotationally disposed at a bracket 160 in the outer casing 110, and the driven gear 150 is engaged with the driving gear 140a. The projection module 120 is disposed on the driven gear 150 for being driven and rotated together with the driven gear 150 by the rotation adjustment member 140 and its driving gear 140a. In other embodiments, the projection module 120 may be rotatably disposed in the outer casing 110 in another appropriate manner and may be driven in another appropriate manner, which should not be construed as limitations to the invention.

In addition, in the embodiment, the bracket 160 rotates, for instance, about a second axis A2 as the rotation axis and is rotatably connected to the main casing 112 of the outer casing 110, whereby the projection module 120 disposed at the bracket 160 is configured to rotate about the second axis A2 as the rotation axis relative to the main casing 112 of the outer casing 110, so as to increase the variability of the projection direction of the projector 100. The second axis A2 is perpendicular to the first axis A1, for instance. Further, the cover 114 provided in the embodiment rotatably covers the open end 112a of the main casing 112, and the bracket 160 where the projection module 120 is disposed is connected to the cover 114 and configured to rotate together with the cover 114 about the second axis A2 as the rotation axis relative to the main casing 112. For instance, the user may manually rotate the cover 114, and the cover 114 drives the projection module 120 disposed at the bracket 160 to rotate.

With reference to FIG. 1 and FIG. 2, the projection module 120 provided in the embodiment includes a plurality of heat dissipation fans 170a and 170b. The heat dissipation fans 170a and 170b face the front end surface 110a of the outer casing 110 and correspond to the heat dissipation openings 110c and 110d. Specifically, the heat dissipation opening 110c is, for instance, an air inlet, and the heat dissipation opening 110d is, for instance, an air outlet. The heat dissipation fan 170a corresponds to the air inlet (the heat dissipation opening 110c), and the heat dissipation fan 170b corresponds to the air outlet (the heat dissipation opening 110d). The heat dissipation fans 170a and 170b are configured to generate a heat dissipation airflow, which flows into the outer casing 110 through the air inlet (the heat dissipation opening 110c) and flows out of the outer casing 110 through the air outlet (the heat dissipation opening 110d), so as to efficiently dissipate the heat of the projection module 120 and other electronic components in the outer casing 110.

Further, the bracket 160 provided in the embodiment includes a connection portion 162 and an extension portion 164. The connection portion 162 is rotatably connected to the outer casing 110 with the second axis A2 as the rotation axis, the extension portion 164 is connected to the connection portion 162 and extends toward the front end surface 110a of the outer casing 110, and the projection module 120 is installed at the extension portion 164. In the embodiment, as shown in FIG. 3 and FIG. 6, the projection module 120 is disposed on the driven gear 150, and the driven gear 150 is rotatably disposed on the bracket 160. Therefore, the projection module 120 is, together with the driven gear 150, configured to be driven by the rotation adjustment member 140 and its driving gear 140a to rotate about the first axis A1, and the bracket 160 where the projection module 120 is disposed is connected to the cover 114 and configured to rotate about the second axis A2. In the embodiment, the connection portion 162 and the extension portion 164 collectively constitute an L-shaped plate member, for instance. The extension portion 164 has an open slot 164a. The projection module 120 is located between the open slot 164a and the front end surface 110a, and the open slot 164a is located near the connection portion 162. The air inlet (the heat dissipation opening 110c) and the air outlet (the heat dissipation opening 110d) are respectively located at opposite sides of a virtual plane S (shown in FIG. 1) where the extension portion 164 is located.

Under the configuration, the heat dissipation fan 170a corresponding to the air inlet (the heat dissipation opening 110c) allows the heat dissipation airflow to enter the outer casing 110 from the heat dissipation opening 110c of the front end surface 110a. The extension portion 164 may achieve a guiding effect on the heat dissipation airflow, so that the heat dissipation airflow entering the outer casing 110 flows along one side of the extension portion 164 toward the open slot 164a through the projection module 120. The heat dissipation airflow then reaches the other side of the extension portion 164 through the open slot 164a and flows toward the air outlet (the heat dissipation opening 110d). Finally, the heat dissipation fan 170b corresponding to the heat dissipation opening 110d allows the heat dissipation airflow to flow out of the outer casing 110 from the heat dissipation opening 110d of the front end surface 110a. Thereby, the heat dissipation airflow may dissipate the heat of the projection module 120 or other electronic components in the outer casing 110, so as to improve the heat dissipation efficiency of the projector 100.

With reference to FIG. 2 and FIG. 6, the projector 100 provided in the embodiment further includes a connector slot 180. The connector slot 180 is, for instance, a slot of a Universal Serial Bus (USB) interface and is disposed at the front end surface 110a of the outer casing 110 and is connected to the projection module 120 through the signal line 130a. In other embodiments, the connector slot 180 may be, for instance, a network slot, a TYPE-C slot, an HDMI slot, and so on, which should not be construed as limitations to the invention. In addition, the projector 100 provided in the embodiment further includes a power supply 190, e.g., a power converter disposed adjacent to the open slot 164a in the outer casing 110 and coupled to the projection module 120 through the power cord 130b. The heat dissipation airflow entering the outer casing 110 may dissipate the heat of the power supply 190 when passing through the vicinity of the open slot 164a. The open slot 164a allows the signal line 130a and the power cord 130b to pass through, so as to enhance the flexibility of the internal configuration of the projector 100. In other embodiments, the power supply 190 may be a battery or a power supply component of another type, and the invention is not limited thereto.

To sum up, the embodiments of the invention have at least one of the following advantages. In the projector provided in one or more embodiments of the invention, the projection opening and the heat dissipation opening are both disposed on the front end surface of the outer casing, and therefore the projector may be embedded in the ceiling, and the projection opening and the heat dissipation opening located on the front end surface are exposed to an exterior side of the ceiling. Compared with the conventional hanging-type projector hanging from the ceiling, the projector provided in one or more embodiments of the invention may be embedded in the ceiling as described above and is less visually obtrusive, and the wires of the projector provided herein may be completely hidden above the ceiling, so as to enhance the aesthetic look of the projector after installation. In addition, the projection module provided herein may rotate in two axial directions relative to the outer casing to change the projection direction of the image beam, so that the projection direction of the projector is less restricted.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the invention is intended to be dedicated to the public regardless of whether the element or component is explicitly recited in the following claims.

What is claimed is:

1. A projector, comprising an outer casing and a projection module, wherein:
   the outer casing has a front end surface, a projection opening, and at least one heat dissipation opening, wherein the projection opening and the at least one heat dissipation opening are located at the front end surface of the outer casing; and
   the projection module is disposed in the outer casing and comprises a light source module, a light valve, and a projection lens, wherein the light source module is configured to provide an illumination beam, the light valve is configured to convert the illumination beam to an image beam, the projection lens protrudes from the front end surface and is configured to project the image beam out of the outer casing through the projection opening, and the projection module is configured to rotate relative to the outer casing to change a projection direction of the image beam,
   wherein the outer casing is configured to be embedded in a ceiling, and the front end surface is exposed to an exterior side of the ceiling.

2. The projector according to claim 1, wherein the projection module comprises at least one heat dissipation fan, and the at least one heat dissipation fan faces the front end surface and corresponds to the at least one heat dissipation opening.

3. The projector according to claim 2, wherein the at least one heat dissipation opening comprises at least one air inlet and at least one air outlet, the number of the at least one heat dissipation fan is plural, and the heat dissipation fans correspond to the at least one air inlet and at least one air outlet, respectively.

4. The projector according to claim 1, wherein the projection module is configured to be rotated about a first axis as a rotation axis relative to at least one portion of the outer casing, and the first axis is perpendicular to an optical axis of the projection lens.

5. The projector according to claim 4, wherein the projector comprises a rotation adjustment member connected to the projection module and configured to drive the projection module to be rotated about the first axis as the rotation axis, and the at least one portion of the rotation adjustment member protrudes out of the outer casing from the front end surface the outer casing.

6. A projector, comprising an outer casing and a projection module, wherein:
   the outer casing has a front end surface, a projection opening, and at least one heat dissipation opening, wherein the projection opening and the at least one heat dissipation opening are located at the front end surface of the outer casing; and
   the projection module is disposed in the outer casing and comprises a light source module, a light valve, and a projection lens, wherein the light source module is configured to provide an illumination beam, the light valve is configured to convert the illumination beam to an image beam, the projection lens protrudes from the front end surface and is configured to project the image beam out of the outer casing through the projection opening, and the projection module is configured to rotate relative to the outer casing to change a projection direction of the image beam,
   wherein the projection module is configured to be rotated about a first axis as a rotation axis relative to at least one portion of the outer casing, and the first axis is perpendicular to an optical axis of the projection lens,
   wherein when the projection module is rotated about the first axis as the rotation axis relative to the at least one portion of the outer casing, the projection lens moves along the projection opening to change the projection direction of the image beam.

7. The projector according to claim 4, wherein the projection module is configured to rotate about a second axis as the rotation axis relative to at least one portion of the outer casing, and the second axis is perpendicular to the first axis.

8. The projector according to claim 7, wherein the outer casing comprises a main casing and a cover, the main casing has an open end, the cover rotatably covers the open end, the front end surface is located at the cover, and the projection module is configured to, together with the cover, rotate about the second axis as the rotation axis relative to the main casing.

9. A projector, comprising an outer casing and a projection module, wherein:
   the outer casing has a front end surface, a projection opening, and at least one heat dissipation opening, wherein the projection opening and the at least one heat dissipation opening are located at the front end surface of the outer casing; and
   the projection module is disposed in the outer casing and comprises a light source module, a light valve, and a projection lens, wherein the light source module is configured to provide an illumination beam, the light valve is configured to convert the illumination beam to an image beam, the projection lens protrudes from the front end surface and is configured to project the image beam out of the outer casing through the projection opening, and the projection module is configured to rotate relative to the outer casing to change a projection direction of the image beam,
   wherein the projector comprises a connector slot disposed at the front end surface and connected to the projection module.

10. A projector, comprising an outer casing and a projection module, wherein:
the outer casing has a front end surface, a projection opening, and at least one heat dissipation opening, wherein the projection opening and the at least one heat dissipation opening are located at the front end surface of the outer casing; and
the projection module is disposed in the outer casing and comprises a light source module, a light valve, and a projection lens, wherein the light source module is configured to provide an illumination beam, the light valve is configured to convert the illumination beam to an image beam, the projection lens protrudes from the front end surface and is configured to project the image beam out of the outer casing through the projection opening, and the projection module is configured to rotate relative to the outer casing to change a projection direction of the image beam,
wherein the projector comprises a bracket, the bracket comprises a connection portion and an extension portion, the connection portion is connected to the outer casing, the extension portion is connected to the connection portion and extends toward the front end surface, and the projection module is installed at the extension portion.

11. The projector according to claim 10, wherein the at least one heat dissipation opening comprises at least one air inlet and at least one air outlet, the at least one air inlet and the at least one air outlet are located at two opposite sides of a virtual plane where the extension portion is located.

12. The projector according to claim 11, wherein the extension portion has an open slot, and the projection module is located between the open slot and the front end surface.

13. The projector according to claim 11, comprising a power supply disposed in the outer casing and coupled to the projection module, the extension portion has an open slot, and the power supply is disposed adjacent to the open slot.

* * * * *